United States Patent [19]

Williams

[11] Patent Number: 4,733,827

[45] Date of Patent: Mar. 29, 1988

[54] ROTARY FOOD PROCESSOR TOOL STORAGE CONTAINER

[75] Inventor: James E. Williams, Stamford, Conn.

[73] Assignee: Cuisinarts, Inc., Greenwich, Conn.

[21] Appl. No.: 918,938

[22] Filed: Oct. 15, 1986

[51] Int. Cl.$^4$ ............................................. A47B 81/00
[52] U.S. Cl. ................................. 241/101.2; 206/373; 241/282.2
[58] Field of Search ................. 312/280, DIG. 33; 206/349, 564, 561, 373, 486–489, 379, 372, 553, 45.31, 45.19, 443, 45.14; 211/13, 40, 69, 70.6, 60.1; 241/101.2, 101.1, 92, 282.1, 282.2

[56] References Cited

U.S. PATENT DOCUMENTS

| | | | |
|---|---|---|---|
| 4,146,131 | 3/1979 | Hoffman et al. | 206/373 |
| 4,160,570 | 7/1979 | Bridges | 211/69 X |
| 4,334,724 | 6/1982 | Rogers | 206/373 X |
| 4,456,184 | 6/1984 | Williams et al. | 241/92 |

*Primary Examiner*—Mark Rosenbaum
*Attorney, Agent, or Firm*—Parmelee, Bollinger & Bramblett

[57] ABSTRACT

A rotary food processor tool storage container is provided for storing and protecting specially configured food processor tools and accessories, and more particularly, a metal blade, a dough blade, and a detachable stem for removable head disc-type tools. It includes an upstanding enclosed hollow base having an inclined support with first and second sloping side-by-side pockets separated by an upstanding partition with the first pocket adapted to store a metal blade rotary tool and the second pocket adapted to store a dough blade rotary food processing tool. The partition laterally separates the pockets and prevents the metal blade from coming into contact with the dough blade. The inclined support includes an elevated support positioned above the first and second pockets which has an open channel therein extending downwardly into the hollow base which is adapted to receive and support therein a detachable stem from a rotary food processing tool.

5 Claims, 5 Drawing Figures

4,733,827

ROTARY FOOD PROCESSOR TOOL STORAGE CONTAINER

BACKGROUND OF THE INVENTION

The food processor has become a very popular kitchen appliance because of its adaptability to perform a number of food processing functions using a variety of attachments and different tools. The appliance is characterized by having a powerful motor drive with a vertical shaft driven thereby extending upwardly into a cylindrical bowl mounted above the drive unit with the various attachments and rotary tools being coupled to the vertical shaft of the motor drive. With the ever increasing number and variety of rotary tools, convenient and safe storage of such devices which are in some instances characterized by being very sharp, is a problem requiring protection to protect the tools. Accordingly, storage means have been provided shown by U.S. Pat. No. 4,557,389 for the rotary food processor tool discs, which patent has been assigned to the Assignee of the present invention. Although this disc holder is extremely useful and can store seven discs securely with the cutting edges protected behind plastic barriers from which the discs slide in and out easily and may be labelled for ready disc identification, the subject disc holder does not accommodate the storage of other tools or for that matter, the stem by which the removable head discs are coupled to the vertical drive shaft of the food processor. For example, the storage rack of that patent cannot accommodate the metal blade rotary tool which is characterized by two crescent-shaped blades mounted diametrically oppositely and facing in opposite directions on a hollow hub having a socket which fits onto and is driven by the drive shaft of the food processor. In addition, there is a dough blade rotary tool having a similar configuration which often cannot be conveniently stored on a shelf or in a drawer.

SUMMARY OF THE INVENTION

Accordingly, it is an object of this invention to provide a novel, rotary food processor tool storage container for safely and conveniently storing specially configured food processor tools and accessories.

A further object of this invention is to provide a novel rotary food processor tool storage container having a smooth, easy to clean surface which will retain its attractive appearance and which is convenient to handle.

A further object of this invention is to provide a novel rotary food processor tool storage container having a hinged see-through cover which may be conveniently locked thereby assuring protection from the sharp cutting edge of the metal blade tool stored therein.

In carrying out this invention in one illustrative embodiment thereof, a rotary food processor tool storage container for storing and protecting specially configured food processor tools and accessories is provided with an upstanding enclosed hollow base having an inclined support member mounted thereon. First and second sloping side-by-side pockets are positioned on the inclined support member separated by an upstanding partition. The first pocket is adapted to store a metal blade rotary food processor tool and the second pocket is adapted to store a dough blade rotary food processor tool with the partition laterally separating the metal blade rotary food processing tool from the dough blade. An elevated support has an open channel therein extending downwardly into the hollow base which is adapted to receive and support therein a detachable stem from a rotary food processing tool. The elevated support is positioned above the first and second pockets on the inclined support. A transparent lid is hinged mounted on the inclined sloping support for covering the storage container when the lid is closed thereon permitting viewing of the rotary tools positioned in the container. This new storage container makes it possible to store rotary tools such as the metal blade and dough blade as well as the detachable stem utilized as an accessory for coupling removable head tools to the vertical shaft of the food processor. These implements are stored conveniently under a see-through cover for ready recognition and may be locked which assures protection from the sharp cutting edge of the metal blade.

BRIEF DESCRIPTION OF THE DRAWINGS

The invention, together with further aspects, features, objects and advantages thereof will be more clearly understood from the following description taken in connection with the accompanying drawings.

DESCRIPTION OF THE PREFERRED EMBODIMENTS

Figure 1:
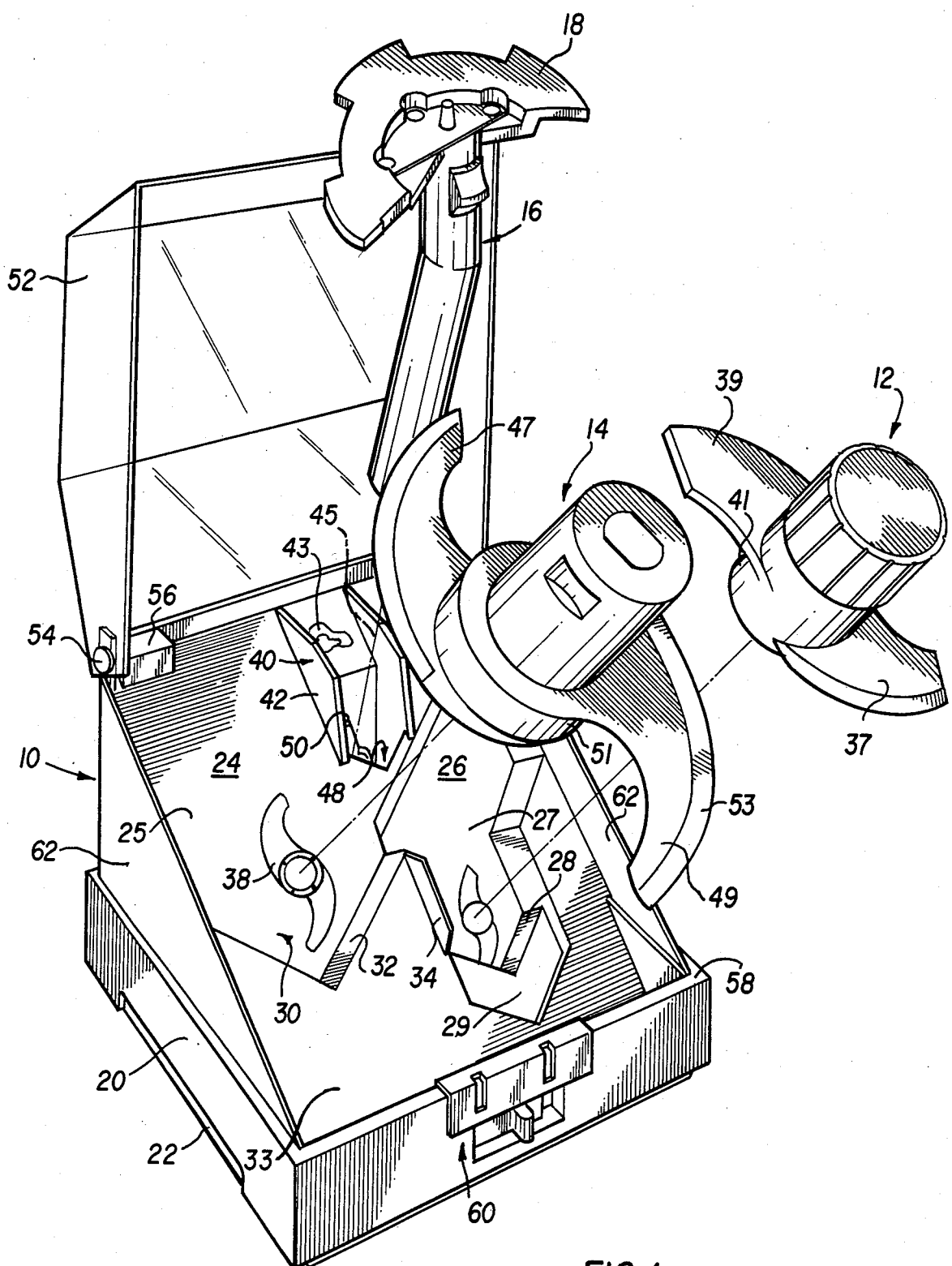
FIG. 1 is a perspective view of the storage container of this invention with the lid open and the implements adapted to be stored therein illustrated in exploded form.

Referring now to FIG. 1, a rotary food processor storage container, referred to generally with the reference numeral 10, is adapted to store specially configured food processor tools and accessories as illustrated in exploded form in FIG. 1. They consist of a dough blade rotary tool 12, a metal blade rotary tool 14 and a detachable stem 16 carrying a crescent-shaped flange 18 which is utilized for mounting removable head rotary tools of the type shown and described in U.S. Pat. No. 4,456,184. Both the rotary tools 12 and 14 are characterized by having blades mounted and separated on a hollow hub having a socket therein which accommodates coupling to the vertical drive shaft of the motor drive of the food processor. The metal blade tool 14 has long crescent-shaped metal blades which are extremely sharp on the leading edges thereof and such implements as well as the stem 16 cannot be conveniently stored on counter tops or in drawers or do not fit into the compact rack disclosed in the aforesaid U.S. Pat. No. 4,557,389. Accordingly, storage container 10 is provided for safely and conveniently providing that function.

Figure 2:
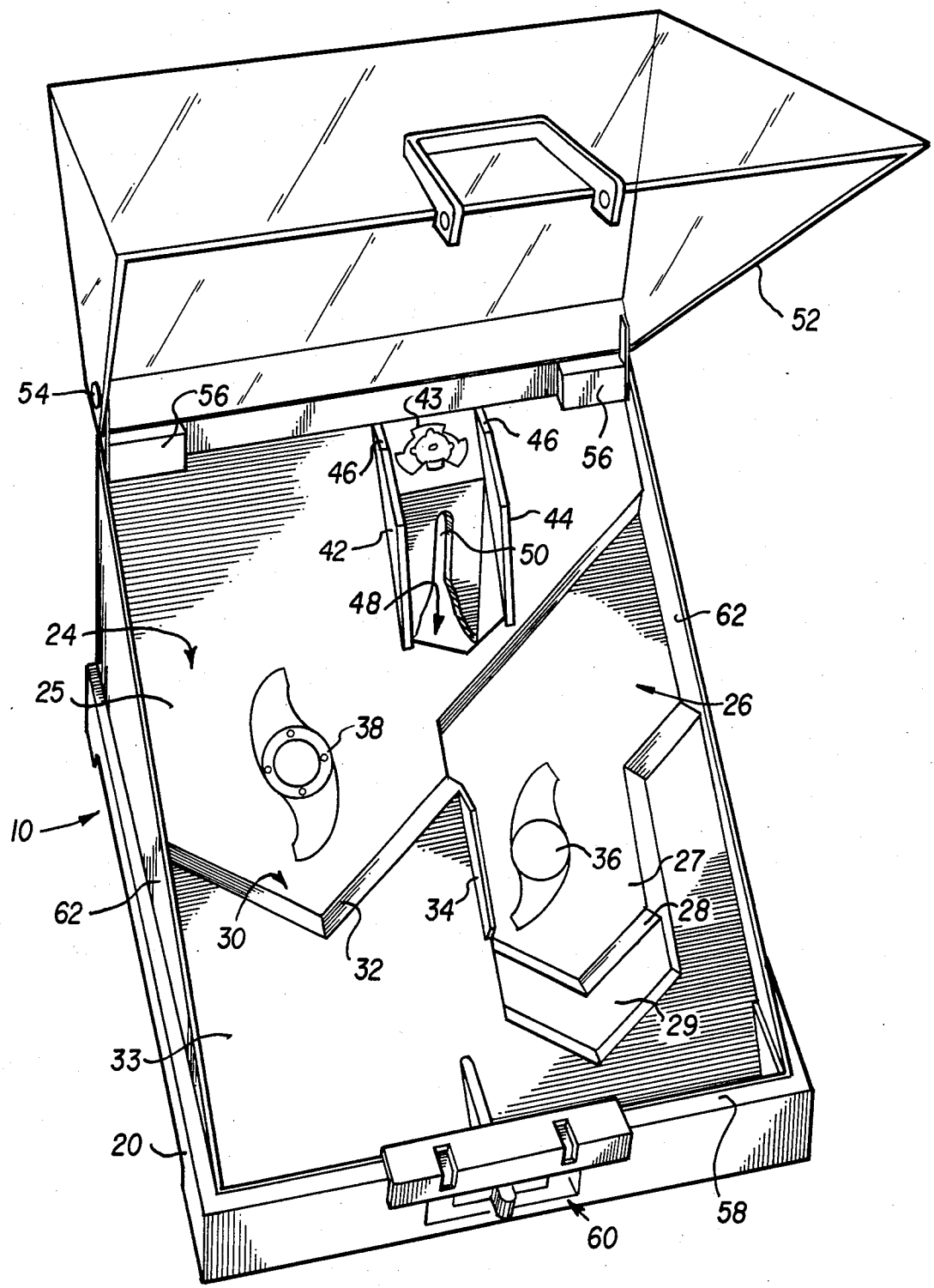
FIG. 2 is a perspective view of the open storage container of this invention with the tools removed therefrom.

The storage container 10 includes an upstanding enclosed hollow base 20 containing finger grips 22 on opposite sides thereof to allow easy lifting of the container 10 even when fully loaded. The base 20 has mounted thereon an inclined support member 24 as will best be seen in FIGS. 2 and 3 defining a first sloping pocket 26 having a V-shaped shelf 28 therein and a second sloping pocket 30 having a V-shaped shelf 32 therein.

The sloping member 24, including its main blade-support surfaces 25, 27, 29 and 33, is generally inclined at an angle to the horizontal in the range from about 40° to 50° and preferrably in the range from 44° to 48°. This sloping member 24 includes the sloping surface 25 which forms a lower-blade-support surface of the second pocket 30 and the depressed sloping surface 27 which forms a lower-blade-support surface of the first pocket 26. The two walls of the V-shaped shelf 32 are perpendicular to the plane of the lower-blade-support surface 25, and the two walls of the V-shaped shelf 28 are perpendicular to the plane of the lower-blade-support surface 27. The first and second pockets 26 and 30, respectively, are separated by a partition 34. The first pocket 26 has an elevated plateau 29 sloping down from the shelf 28 forming an upper-blade-support surface of the first pocket 28, while the second pocket 30 has a larger elevated plateau 33 sloping down from the shelf 32 and forming an upper-blade-support surface of the second pocket 30. The pockets 36 and 30 have reduced-size shapes 36 and 38 imprinted therein, respectively, which effectively illustrate the type of tool which is to be stored therein. Accordingly, the dough blade tool 12 is positioned in the first pocket 26 with its lower blade 37 (FIG. 1) sloping upwardly resting on the bottom surface 27 of the pocket 26 and its upper blade 39 sloping downwardly resting on the plateau 29 extending from the shelf 28, and this shelf 28 has walls of depth to receive the lower side portion 41 of the hub of the rotary tool 26. In other words, in order to place the dough blade tool 12 into its storage pocket 26, it is turned 180° from the position as illustrated in FIG. 1, so that its lower blade 37 will slope upwardly parallel with the surface 27 of the pocket 26 and its upper blade 39 will slope downwardly parallel with the plateau 29 and so that side surface 41 of the lower portion of the hub of this tool 12 will seat and rest against the V-shaped shelf 28. The V-shape of this shelf 28 serves to centralize and hold in position the cylindrical side hub surfaces 41 with respect to the two converging walls forming the apex of this V-shaped shelf. This side hub surface 41 is below the upper blade 39.

Likewise, the second pocket 30 carries the lower blade 47 of the metal blade rotary tool 14 with the upper blade 49 resting on the plateau 33 adjacent to the V-shaped shelf 32 whose height accommodates the side 51 on the hub below the upper blade 49 of the metal blade rotary tool 14 as illustrated in FIG. 1. Thus the metal blade tool 14 is shown in FIG. 1 in the position which it will occupy in the second pocket 30. Its lower blade 47 will rest against the sloping lower-blade-support surface 25, its upper blade 49 will rest against the sloping plateau 33, and the side surface 51 of its hub will seat and rest against the V-shaped shelf 32 being centralized and held in position by the two converging walls forming the apex of this V-shaped shelf 32. The partition 34 conveniently prevents the sharp leading edge 53 of the upper blade 49 of the rotary tool 14 from contacting any portion of the dough blade tool 12 when the rotary tools 14 and 12 are stored side-by-side in the container 10.

An elevated support referred to generally with the reference numeral 40, is provided above the first and second pockets 26 and 30, respectively, on the inclined support member 24. The elevated support 40 has a pair of upstanding ribs 42 and 44 forming two parallel elevated spaced horizontal support ledges 46 at the top thereof. These spaced horizontal ledges 46 are adapted to support the crescent-shaped flange or head 18 of the detachable stem 16, shown in FIG. 1. The elevated support 40 includes a downwardly-extending open channel 48 located between the ribs 42, 44 adapted to receive the stem 16, as shown by the dashed line 45 in FIG. 1. A groove 50 is provided in the open channel 48 to accommodate the detachable stem 16 which has a longitudinally extending ridge thereon. A small shape 43 is imprinted between the ribs 42 and 44 above the channel 48 to indicate to the user that the stem is to be stored therein.

A transparent lid 52 is hinged-mounted on pins 54 on bracket blocks 56 on the inclined support member 24. The lid 52 and base 20 are provided with a complementary latching lock structure referred to generally at 60 for preventing the container 10 from accidently opening. The preferred form of such lock structure forms the subject matter of co-pending application (Ser. No. 918,937) but it will be apparent that different types of latching or locking structure may be provided.

Figure 3:
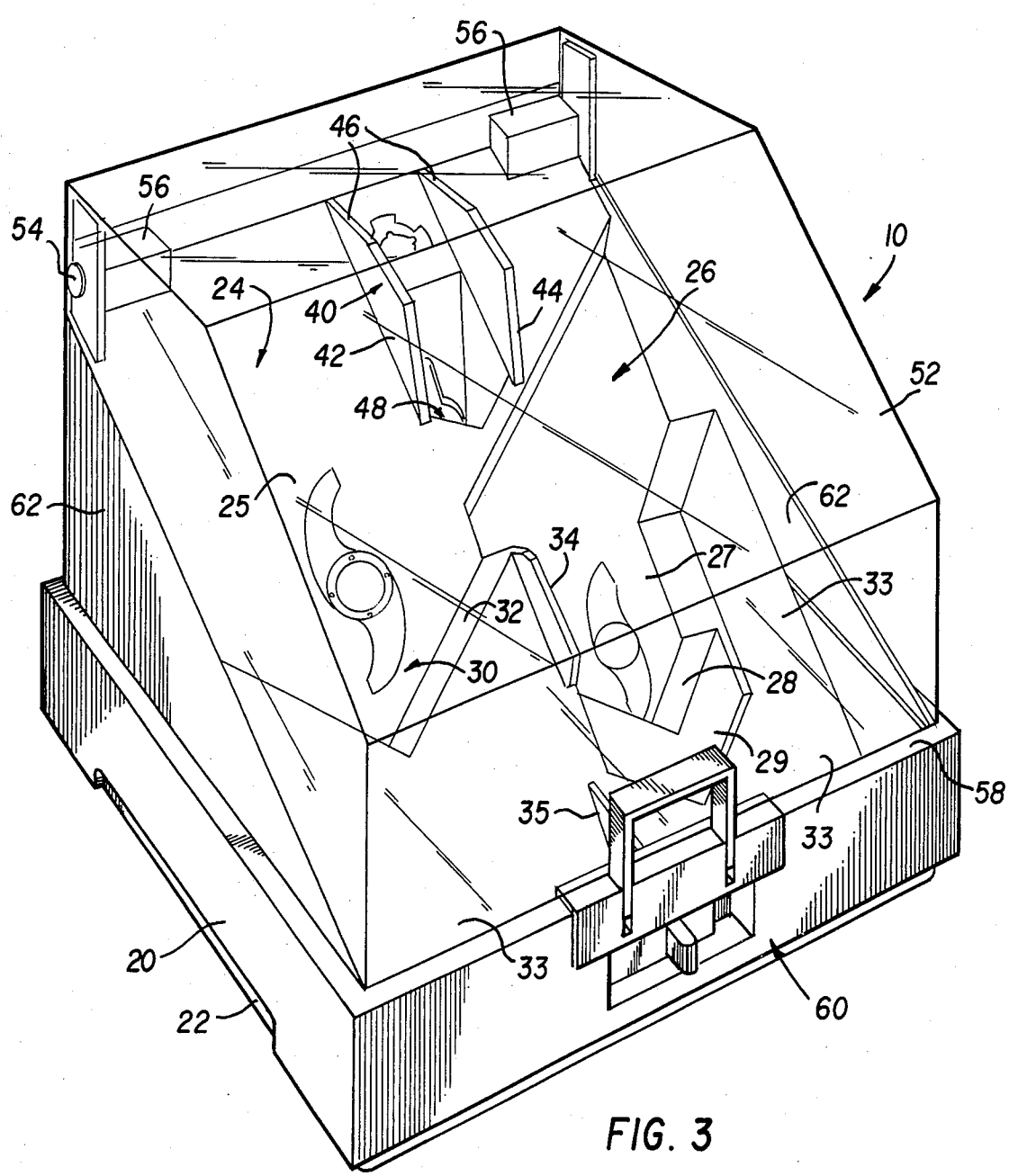
FIG. 3 is a perspective view of the container of the present invention with the lid closed and the tools removed.
Figure 4:
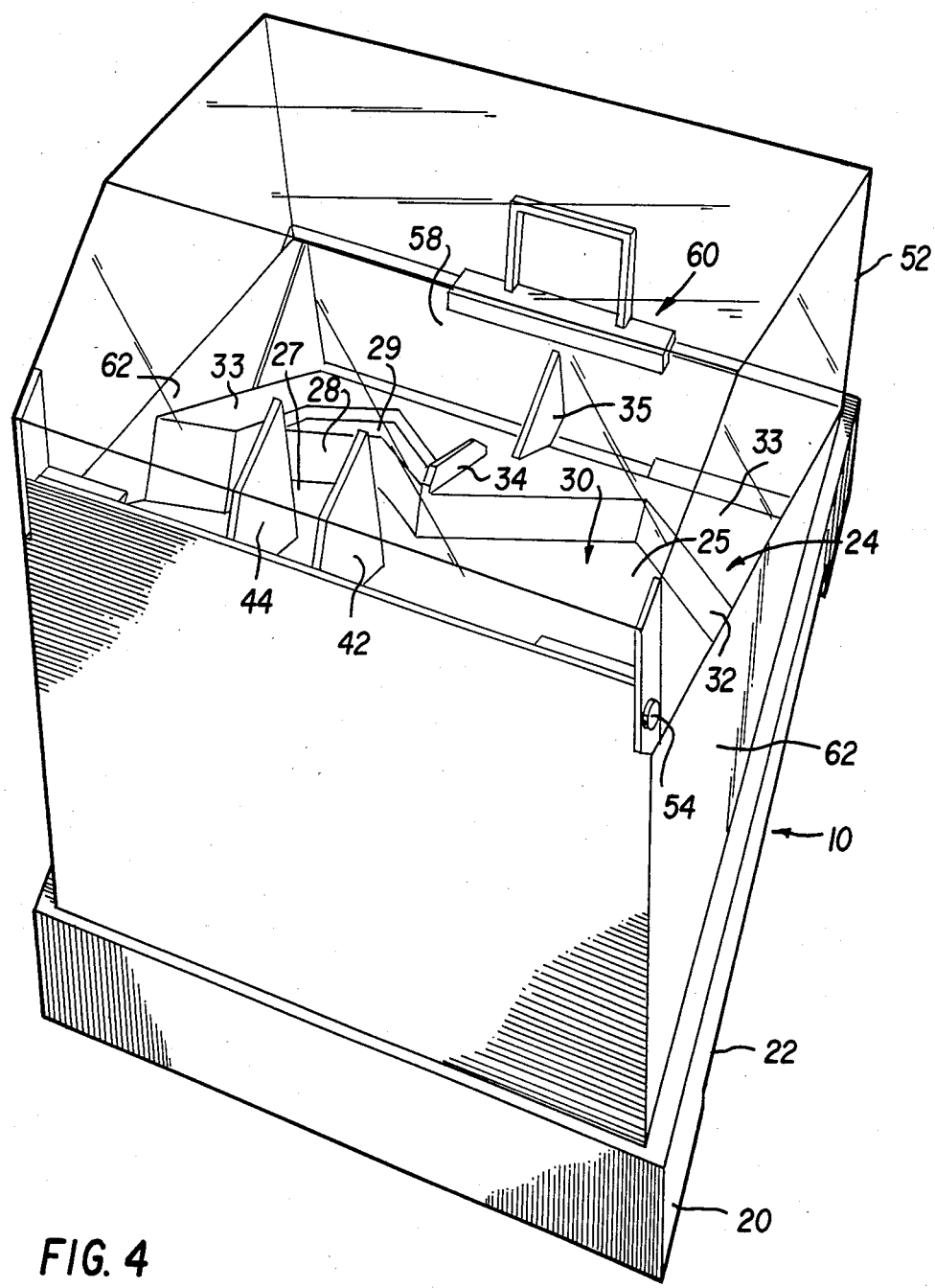
FIG. 4 is a rear perspective view of the container as shown in FIG. 3.
Figure 5:
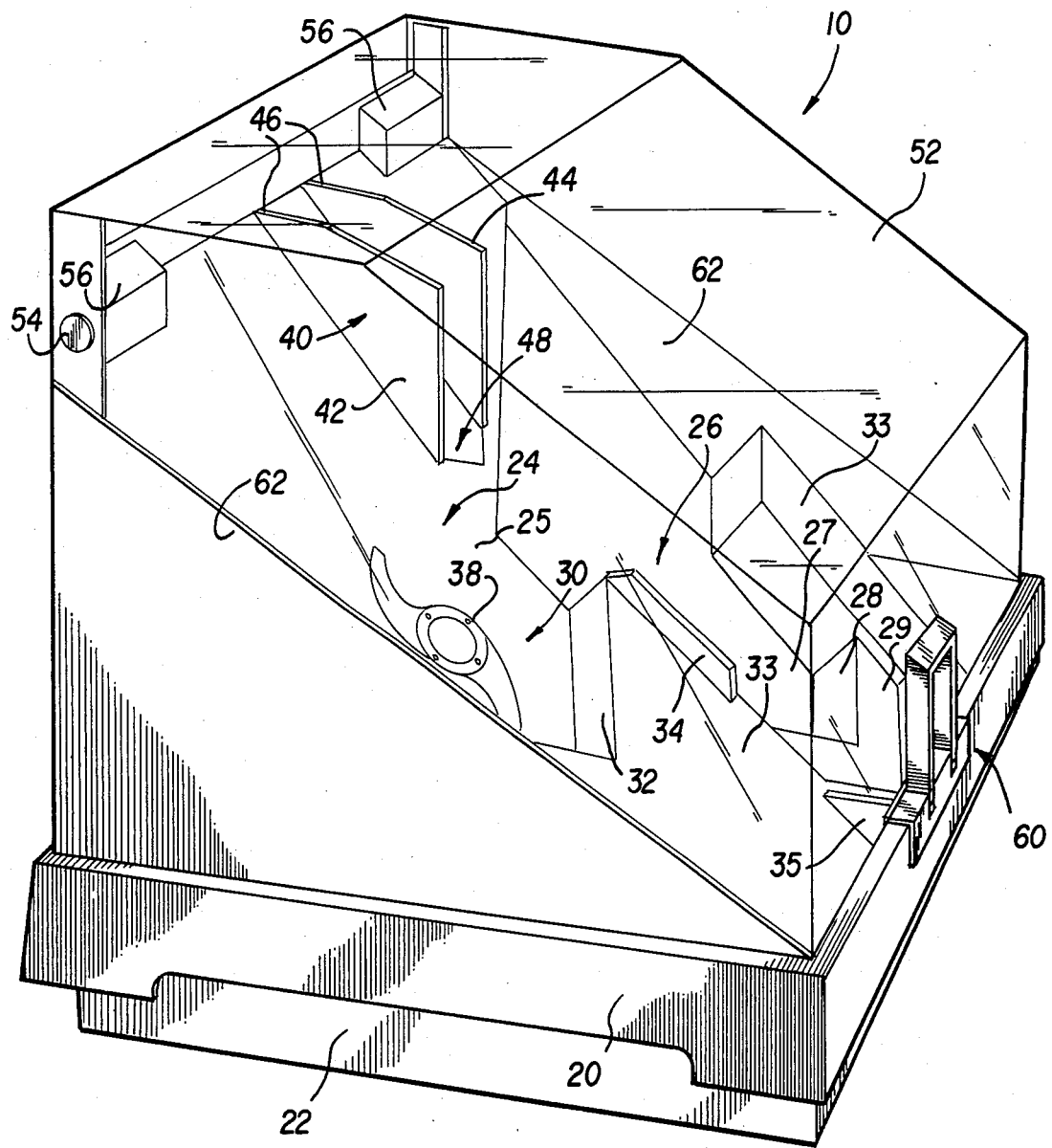
FIG. 5 is a side perspective view of the container shown in FIG. 3.

FIGS. 3-5 show different views of the decorative, convenient and utilitarian storage container for housing and separating specially configured food processor tools. From an overall viewpoint the support member 24 is shaped to provide five different levels of support as follows:

1. There is the uppermost horizontal support level provided by the two ledges 46 at the upper edges of the ribs 42, 44.

2. There is the first sloping level of the plateau 33 which supports the upper blade 49 of the metal-blade cutting tool 14. This plateau surface 33 continues over to the right side of the container beyond the first pocket 26. This plateau surface 33 constitutes the largest plane surface of the support member 24. The tip end of the upper blade 39 of the dough blade 39 also rests upon this plateau surface 33.

3. A second sloping level slightly lower than the main plateau surface 33 is the small chevron-shaped plateau surface 29 extending downwardly from the two converging walls which form the V-shaped shelf 28. The main portion of the upper blade 39 of the tool 12 rests above this chevron-shaped plateau 29.

4. A third sloping level is the surface 25 of the pocket 30.

5. A fourth and the lowest level is the depressed sloping surface 27 of the pocket 26. This surface 27 is below the level of the sloping surface 25.

It will be understood that the open channel 48 for receiving the tool stem 16 extends down to the bottom of the hollow base 20.

As seen most clearly in FIGS. 4 and 5, there is a small triangular partition 35 which connects the sloping plateau 33 with the front wall 58 of the container. The latching lock structure 60 is mounted upon this front wall 58 in the center. There are side walls 62 (FIGS. 3, 4 and 5) which project up above the sloping plateau 33 and extend from the front wall 58 to the back of the container 10 near to the bracket blocks 56 from which the hinge pins 54 protrude.

This new storage container makes it possible to store the metal blade, dough blade and detachable stem for food processors safely and conveniently under a locked see-through cover. This container will prevent inadvertent contact with and assures protection from the sharp cutting edges of the metal blade. The storage container of the present invention is preferably made of high impact plastic with a smooth, easy to clean surface which will retain its attractive new look.

The new storage container of this invention is compact and measures only 6¼ by 6¼ inches. It can be used by itself or can be coordinated with the disc holder of U.S. Pat. No. 4,557,389 to which it can be attached with a convenient, easy to fasten plastic clamp which may be provided with this storage container.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A rotary food processor tool storage container for storing and protecting specially configurated food processor tools and accessories comprising:

an upstanding enclosed hollow base having an inclined support member thereon, first and second sloping, side-by-side open pockets positioned in said inclined support member separated by an upstanding partition positioned between said sloping open pockets, said first pocket adaped to store a dough blade rotary food processor tool and said second pocket adapted to store a metal blade rotary food processor tool, said partition laterally separating the metal blade of said metal blade rotary food processing tool from said dough blade food processor tool, said first and second open pockets each having shelves adapted to accommodate the nesting of the side surface of a hub portion below one blade of the associated rotary tool which is adapted to be stored thereon, each of said pockets having a sloping lower-blade-support surface, the sloping lower-blade-support surface of said first pocket for storing said dough blade tool is at a lower level than said sloping lower-blade-support surface of said second pocket for storing said metal blade tool, and the planes of said lower-blade-support surface are parallel and are inclined to the horizontal at an angle in the range from about 40° to about 50° and said shelves, respectively, of said first and second pockets being defined by walls oriented generally perpendicular to the plane of the lower-blade-support surface of the respective open pocket, an elevated support extending upwardly from said inclined support member and having an open channel therein extending downwardly into said hollow base adapted to receive support therein a detachable stem from a rotary food processing tool, said elevated support being positioned above said first and second pockets on said inclined support member, and a transparent lid pivotally mounted on said inclined support member for covering said storage container when said lid is closed thereon and permitting viewing of the rotary tools positioned thereon.

2. The storage container as claimed in claim 1, wherein said elevated support comprises a pair of parallel ribs having said channel positioned therebetween forming a flat shelf for supporting the head of a detachable stem which extends downwardly on said channel where the head thereon rests on the shelf formed by said ribs.

3. The storage container as claimed in claim 1, wherein said channel has a rear wall with a notch therein which notch is adapted to receive a keyway thereby adapting said elevated support to accommodate the receipt of a removable stem having an axial ridge thereon.

4. The food processor tool storage container as claimed in claim 3, in which:

the respective shelves of said first and second pockets are each defined by a pair of converging walls meeting at a central vertex in a V-shaped configuration.

5. The food processor tool storage container as claimed in claim 3, in which:

said support member includes a plateau surface sloping downwardly from the top of the wall defining the shelf of said second pocket, and said sloping plateau surface is in a plane elevated above the plane of the lower-blade-support surface of said second pocket, and the plane of said plateau surface and the plane of said lower-blade-support surface are parallel and inclined to the horizontal at an angle in the range from about 40° to about 50°.

* * * * *